April 27, 1943.    M. NEUBERT    2,317,794
RIVET CONNECTION
Filed July 29, 1939
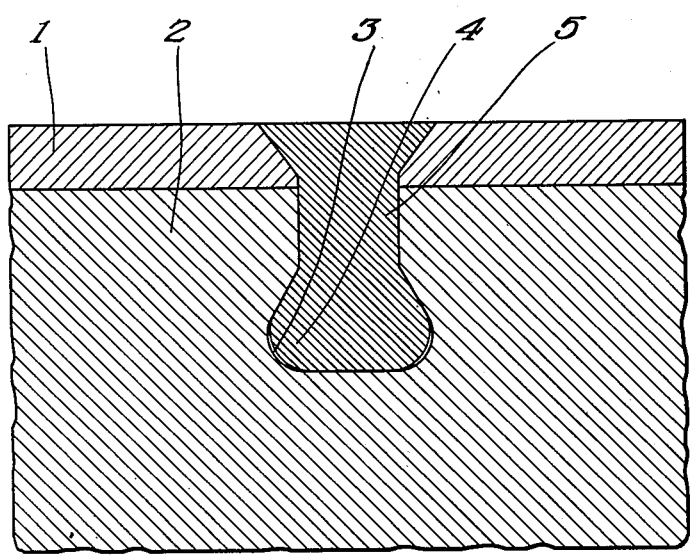
INVENTOR.
MARTIN NEUBERT.
BY Karl A. Mayr
ATTORNEY.

Patented Apr. 27, 1943

2,317,794

UNITED STATES PATENT OFFICE 2,317,794

RIVET CONNECTION

Martin Neubert, Friedrichshafen-Manzell-on-the-Bodensee, Germany; vested in the Alien Property Custodian Application July 29, 1939, Serial No. 287,186
In Germany September 23, 1938

4 Claims. (Cl. 78—54)

The present invention relates to a rivet connection for riveting comparatively thin material such as sheets, plates and the like to relatively thick material.

Hitherto the thin and thick material were completely bored through and a long and comparatively thin rivet was inserted into the bore to extend all the way therethrough. Because of the extraordinary proportion of the length of the rivet with respect to its diameter the bore was not completely filled by the rivet.

In order to assure a tight fit of the rivet in the hole larger diameters had to be used than were necessary to hold the parts to be joined together. Such large diameters require large holes which are particularly undesirable in cases where the parts to be joined are subjected to tensile stresses. The use of screws of special configuration is expensive particularly in aircraft work where great numbers of rivets or screws are needed. Notched pins have been proposed to solve the problem; these, however, are of too limited tensile strength.

It is an object of the present invention to provide a rivet connection for quickly, cheaply and securely interconnecting thick and thin members which does not have the shortcomings stated before and whereby the individual rivets are adapted to withstand great tensile stress in the direction of their longitudinal axis.

With the connection according to the present invention the bore does not extend all the way through the thick member and is enlarged at its inner end by means of a drill of special configuration. The enlargement may have a conical, ball or other configuration. The rivet having a setting head and being of only slightly smaller diameter than the bore is then inserted and forced into the hole. Upon abutment on the bottom of the hole or cavity the rivet is upset and so expanded that it fills the enlarged bottom end of the hole and an anchoring head is formed. Rivets formed according to the invention withstand great tensile stresses in the direction of their axis because they do not rely on frictional engagement but positively engage the thick material.

Further and other objects and advantages of the present invention will be apparent from the accompanying specification and claims and shown in the drawing which, by way of illustration, shows what I now consider to be a preferred embodiment of my invention.

The one figure of the drawing is a cross-sectional view of a rivet connection according to the present invention.

The thin material, for example sheet metal, 1 is connected to the thick material 2 by means of the rivet 5 which has an expanded lower end 4 which fills the cavity or enlarged inner end 3 of the rivet hole, said enlarged inner end constituting about one half of the depth of said hole.

While I believe the above described embodiment of my invention to be a preferred embodiment, I wish it to be understood that I do not desire to be limited to the exact details of design and construction shown and described, for obvious modifications will occur to a person skilled in the art.

I claim:

1. A rivet connection for riveting relatively thin material to relatively thick material, said connection comprising a perforated portion in said relatively thin material, said relatively thick material abutting said perforated portion and having a substantially flat bottomed cavity comprising a relatively narrow cylindrical throat portion continuing into a substantially conically widened out inner portion, said inner portion being narrowed adjacent to the bottom of said cavity, and a solid, substantially flat bottomed and cylindrical rivet extending through said perforated portion and closely fitting in said throat portion and abutting against the bottom of said cavity and, when driven, expanding into an enlarged end portion closely fitting into and conforming with said widened out and narrowed portion of said cavity.

2. A rivet connection for riveting relatively thin material to relatively thick material, said connection comprising a perforated portion in said relatively thin material, said relatively thick material abutting said perforated portion and having a cavity comprising a shaft-like outer portion and an enlarged inner end portion having a substantially flat central bottom portion, and a solid rivet extending through said perforated portion and having a substantially flat bottomed end portion abutting said central bottom portion and when driven, being guided by said shaft like outer portion and moving accurately along the longitudinal axis of said cavity and expanding in substantially lateral direction into an enlarged end portion completely filling said enlarged portion of said cavity, and retaining a shaftlike portion tightly fitting into the shaft-like outer portion of said cavity.

3. A rivet connection for riveting relatively thin material to relatively thick material, said connection comprising a perforated portion in said relatively thin material, said relatively thick material abutting said perforated portion and having a cavity comprising a cylindrical outer portion and an enlarged and circumferentially rounded out inner end portion having a substantially flat bottom, and a cylindrical and solid rivet extending through said perforated portion and having a substantially flat end abutting said flat bottom and, when driven, being guided by said shaft like outer portion and moving accurately along the longitudinal axis of said cavity and expanding into an enlarged and circumferentially rounded out end portion fitting into said enlarged portion of said cavity, and retaining a cylindrical portion fitting into the cylindrical portion of said cavity.

4. A rivet connection as claimed in claim 3, in which said cylindrical outer portion of said cavity is substantially as long as said enlarged inner portion is deep.

MARTIN NEUBERT.